United States Patent
Canter et al.

[11] Patent Number: 6,157,161
[45] Date of Patent: Dec. 5, 2000

[54] LOW COST BATTERY CHARGING SYSTEMS

[75] Inventors: Stanley Canter, Hermosa Beach; Christopher F. Hoeber, Los Altos Hills; Aaron J. Mendelsohn, Campbell, all of Calif.

[73] Assignee: Space Systems/Loral, Inc., Palo Alto, Calif.

[21] Appl. No.: 09/361,867

[22] Filed: Jul. 27, 1999

[51] Int. Cl.[7] ................................................ H02J 7/00
[52] U.S. Cl. ........................... 320/101; 320/162; 323/906
[58] Field of Search .................................. 320/101, 162; 323/906

[56] References Cited

U.S. PATENT DOCUMENTS

| | | | |
|---|---|---|---|
| 3,740,636 | 6/1973 | Hogrefe | 320/101 |
| 3,773,892 | 11/1973 | Adler et al. | 340/825.8 |
| 3,816,804 | 6/1974 | Cardwell, Jr. et al. | 320/102 |
| 4,494,063 | 1/1985 | Callen et al. | 320/101 |
| 4,661,758 | 4/1987 | Whittaker | 320/101 |
| 5,394,075 | 2/1995 | Ahrens et al. | 320/39 |
| 5,703,468 | 12/1997 | Petrillo | 320/101 |
| 5,714,869 | 2/1998 | Tamechika et al. | 320/101 |
| 6,034,506 | 3/2000 | Hall | 320/117 |
| 6,049,190 | 4/2000 | Canter et al. | 320/101 |

*Primary Examiner*—Peter S. Wong
*Assistant Examiner*—Gregory J Toatley, Jr.
*Attorney, Agent, or Firm*—Kenneth W. Float

[57] ABSTRACT

A battery charging system that may advantageously be used to directly charge a battery of a spacecraft, for example. The battery charging system permits charging of the battery without the use of power conditioners or dedicated charging arrays. Primary and secondary solar array strings are coupled by way of a shunt regulator circuit to a power bus, such as a power bus of the spacecraft. A shunt regulator circuit is coupled to the secondary solar array string and to the power bus. Charge control relays are coupled between the secondary solar array string and the battery. A computer is coupled to the shunt regulator circuit and to the charge control relays. Current from the secondary solar array string is used to charge the battery when the charge control relays are closed. If the computer determines that the battery is fully charged, the charge control relays are commanded open and current flows to the power bus unless shunted by the shunt regulator circuit. Fine control over the battery charge is achieved by adjusting the charging time and the number of circuits of the secondary solar array string that are connected to the battery.

16 Claims, 1 Drawing Sheet

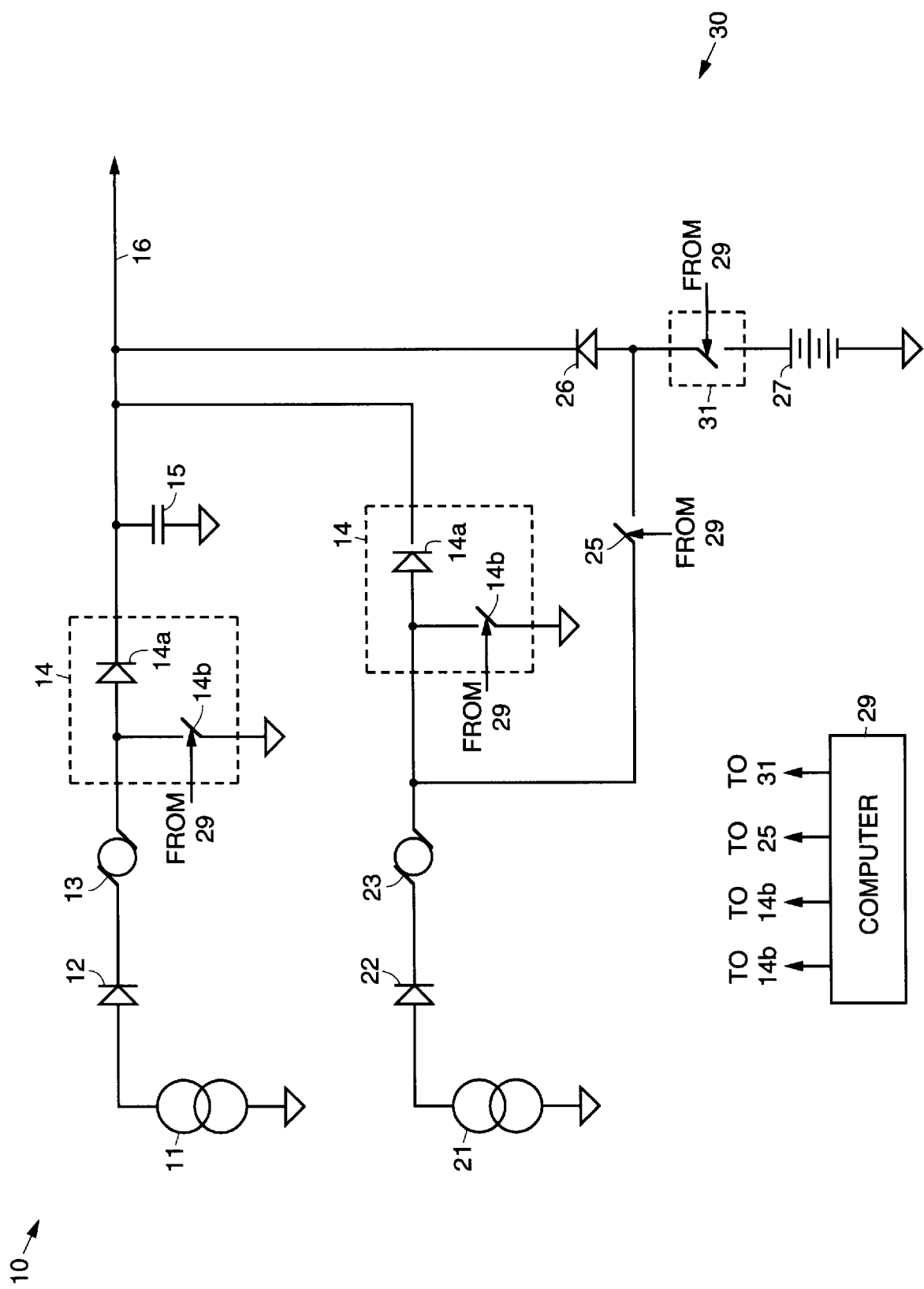

LOW COST BATTERY CHARGING SYSTEMS

BACKGROUND

The present invention relates generally to battery charging systems, and more particularly, to low cost battery charging systems for directly charging batteries of a spacecraft without the use of power conditioners.

Existing spacecraft developed by the assignee of the present invention use either of two battery charging systems that employ power converters to regulate and control battery charging current, or dedicated charge arrays in conjunction with switching relays to charge batteries directly. Tempo and FOS-II spacecraft are examples of the first system and the Intelsat VII spacecraft is an example of the second system.

In these conventional spacecraft, the use of power conditioners increases the mass and cost of the spacecraft, and also increases the thermal dissipation requirements of the spacecraft. In such conventional spacecraft, during periods of solar array shadowing, or at summer solstice when charging requirements are reduced and when charging requirements are minimal, additional solar array power is not used to power the payload, but instead is used to recharge the batteries. Furthermore, in conventional spacecraft, battery charger failures adversely affect the reliability of the spacecraft.

It would be desirable to have battery charging systems for use in a spacecraft that directly charges its batteries and which overcomes the limitations of conventional systems. Accordingly, it is an objective of the present invention to provide for low cost battery charging systems for directly charging batteries of a spacecraft without the use of power conditioners.

SUMMARY OF THE INVENTION

To meet the above and other objectives, the present invention provides for low cost battery charging systems that may advantageously be used to directly charge a battery of a spacecraft. The present battery charging system permits the charging of a battery, such as a spacecraft battery charged by way of solar cells, for example, without the use of power conditioners or dedicated charging arrays.

An exemplary battery charging system comprises primary and secondary solar array strings. A shunt regulator circuit is coupled between the primary and secondary solar array strings and to a power bus, such as a power bus of a spacecraft. A shunt regulator circuit is coupled to the secondary solar array string and to the power bus. Charge control relays are coupled between the secondary solar array string and the battery. A computer is coupled to the shunt regulator circuit and to the charge control relays.

A second battery charging system may be used with a cross bus design. In this case, battery disconnect relays are coupled to the battery.

Current from the solar array circuits of the secondary solar array string is used to charge the battery when the charge control relays are closed. If the computer determines that the battery is fully charged, the charge control relays are commanded open and current flows to the power bus unless shunted by the shunt regulator circuit. Fine control over the state of charge of the battery is achieved by adjusting the charging time and the number of circuits of the secondary solar array string that are connected to the battery.

Eliminating the use of power conditioners eliminates the mass, cost and thermal dissipation associated with the power conditioners. Eliminating the charge arrays allows additional solar array power to be used to power the payload when not required for battery charging. This is especially advantages during periods of array shadowing or at summer solstice when charging requirements are reduced and when charging requirements are minimal. Further, the present invention permits unlimited redundancy which eliminates charger failure rates from affecting satellite reliability.

BRIEF DESCRIPTION OF THE DRAWINGS

The various features and advantages of the present invention may be more readily understood with reference to the following detailed description taken in conjunction with the accompanying drawing FIGURE, which illustrates a battery charging system in accordance with the principles of the present invention.

DETAILED DESCRIPTION

Referring to the sole drawing FIGURE, it illustrates a battery charging system 10 in accordance with the principles of the present invention. The battery charging system 10 is designed for use with a battery 27 of a spacecraft 30.

The battery charging system 10 comprises a primary solar array string 11 that typically includes from one to fifteen circuits. The circuits of the primary solar array string 11 are coupled by way of a protection diode 12 and a slip ring 13 to a first portion of a shunt regulator circuit 14. The shunt regulator circuit 14 includes a diode 14a and a controllable switch 14b that is coupled to a spacecraft computer 29. The first portion of the shunt regulator circuit 14 is coupled between the slip ring 13 and the main (power) bus 16 of the spacecraft 30. A capacitor 15 is coupled between the main bus 16 and ground.

The battery charging system 10 further comprises a secondary solar array string 21 that typically includes from one to five circuits. The circuits of the secondary solar array string 21 are coupled by way of a protection diode 22 and a slip ring 23 to a second portion of the shunt regulator circuit 14. The second portion of the shunt regulator circuit 14 also includes a diode 14a and a controllable switch 14b that is coupled to the spacecraft computer 29. The second portion of the shunt regulator circuit 14 is coupled between the slip ring 23 and the main (power) bus 16 of the spacecraft 30. Charge control relays 25 are coupled between the secondary solar array string 21 and the battery 27 of a spacecraft 30. A protection diode 26 is coupled between the charge control relay 25 and the main bus 16 of the spacecraft 30.

Current from the solar array circuits of the secondary solar array string 21 is used to charge the battery 27 when the charge control relays 25 are closed. If the battery 27 is fully charged, as determined by the computer 29, then the charge control relays 25 are commanded open and current flows to the main bus 16 of the spacecraft 30 unless shunted by the normal operation of the shunt regulator circuit 14. Fine control over the state of charge of the battery 27 is achieved by adjusting the charging time and the number of circuits of the secondary solar array string 21 that are connected to the battery 27.

Although the system 10 does not operate the primary and secondary solar array strings 11, 21 to operate at a peak power point, it is more efficient than using charge converters because it does not dissipate any power in the converters. The battery charging system 10 does not require a minimum load to fully regulate the power bus 16.

A second battery charging system 10 designed in accordance with the principles of the present invention may be used with a cross bus design. In the second battery charging system 10, disconnect relays 31 (shown in dashed lines) are coupled in series with the battery 27.

Thus, improved battery charging systems for use in directly charging a battery, such as the battery of a spacecraft, have been disclosed. It is to be understood that the described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A battery charging system for charging a battery, comprising:
    a primary solar array string;
    a shunt regulator circuit coupled to the primary solar array string and to a power bus;
    a secondary solar array string;
    a shunt regulator circuit coupled to the secondary solar array string and to the power bus;
    charge control relays coupled between the secondary solar array string and the battery; and
    a computer coupled to the shunt regulator circuits and to the charge control relays.

2. The battery charging system recited in claim 1 wherein the battery comprises a battery of a spacecraft.

3. The battery charging system recited in claim 1 wherein the primary solar array string comprises from one or more circuits.

4. The battery charging system recited in claim 1 wherein the primary solar array string comprises protection diode and a slip ring.

5. The battery charging system recited in claim 1 wherein the shunt regulator circuits comprise a diode and a controllable switch coupled to the spacecraft computer.

6. The battery charging system recited in claim 1 wherein the secondary solar array string comprises from one or more circuits.

7. The battery charging system recited in claim 1 further comprising a protection diode coupled between the charge control relay and the power bus.

8. The battery charging system recited in claim 1 wherein the power bus comprises a main bus of a spacecraft.

9. The battery charging system recited in claim 1 wherein the battery charging system further comprises battery disconnect relays coupled to the battery.

10. A battery charging system for use with a battery of a spacecraft, comprising:
    a primary solar array string;
    a shunt regulator circuit coupled to the primary solar array string and to a power bus;
    a secondary solar array string;
    a shunt regulator circuit coupled to the secondary solar array string and to the power bus;
    charge control relays coupled between the secondary solar array string and the battery of the spacecraft; and
    a spacecraft computer coupled to the shunt regulator circuits and to the charge control relays.

11. The battery charging system recited in claim 10 wherein the primary solar array string 1 comprises from one to fifteen circuits.

12. The battery charging system recited in claim 10 wherein the primary solar array string comprises protection diode and a slip ring.

13. The battery charging system recited in claim 10 wherein the shunt regulator circuits comprise a diode and a controllable switch coupled to the spacecraft computer.

14. The battery charging system recited in claim 10 wherein the secondary solar array string comprises from one to five circuits.

15. The battery charging system recited in claim 10 further comprising a protection diode coupled between the charge control relay and the power bus.

16. The battery charging system recited in claim 10 wherein the battery charging system further comprises battery disconnect relays coupled to the battery.

* * * * *